United States Patent
Lee et al.

(10) Patent No.: US 9,876,892 B2
(45) Date of Patent: *Jan. 23, 2018

(54) AUTOMATIC POWER-OFF OF WIRELESS COMMUNICATION DEVICE FROM LINKED DEVICE

(71) Applicant: Apple Inc., Cupertino, CA (US)

(72) Inventors: Michael M. Lee, San Jose, CA (US); Jeffrey J. Terlizzi, San Francisco, CA (US); Christopher D. McKillop, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,129

(22) Filed: May 10, 2016

(65) Prior Publication Data

US 2016/0366262 A1    Dec. 15, 2016

Related U.S. Application Data

(60) Continuation of application No. 14/623,369, filed on Feb. 16, 2015, now Pat. No. 9,344,966, which is a continuation of application No. 13/854,242, filed on Apr. 1, 2013, now Pat. No. 8,959,368, which is a continuation of application No. 13/167,477, filed on Jun. 23, 2011, now Pat. No. 8,412,964, which is a division of application No. 11/650,067, filed on Jan. 5, 2007, now Pat. No. 7,987,378.

(51) Int. Cl.
*H04M 1/725* (2006.01)
*H04W 4/00* (2009.01)
*H04W 52/02* (2009.01)

(52) U.S. Cl.
CPC ......... *H04M 1/7253* (2013.01); *H04W 4/008* (2013.01); *H04W 52/028* (2013.01); *H04W 52/0235* (2013.01); *Y02B 60/50* (2013.01)

(58) Field of Classification Search
CPC ............... H04M 1/7253; H04W 4/008; H04W 52/0235; H04W 52/028; Y02B 60/50
See application file for complete search history.

(56) References Cited

U.S. PATENT DOCUMENTS 6,704,428 B1   3/2004 Wurtz
7,657,024 B2   2/2010 Huang
(Continued)

*Primary Examiner* — Abdelmoniem Elamin
(74) *Attorney, Agent, or Firm* — Meyertons, Hood, Kivlin, Kowert & Goetzel, P.C.

(57) ABSTRACT

Methods and systems for powering-off a wireless communication device from a linked device are provided. A device can transmit a wireless communication signal to a linked device to instruct the linked device to power-off. In this manner, the user need only turn off one device manually which results in all linked devices being powered off. This process can be initiated by a user through a device directly linked with the device to be powered-off or through a device that is indirectly connected, through one or more wireless communication networks, with the device to be powered-off. This process can also be automatically initiated by a device when a set of predetermined conditions exist. Once instructed to do so, a device can initiate a predetermined power-off process which can involve terminating any ongoing functions and turning off various subsystems. In accordance with the present invention, a user can initiate a power-off of all the devices on a wireless communication network through a single device.

18 Claims, 7 Drawing Sheets

(56) References Cited

U.S. PATENT DOCUMENTS

| | | |
|---|---|---|
| 7,725,094 B2 | 5/2010 | Chary |
| 7,983,427 B2 | 7/2011 | Yamkovoy et al. |
| 7,987,378 B2 | 7/2011 | Lee et al. |
| 8,412,964 B2 | 4/2013 | Lee et al. |
| 8,959,368 B2 | 2/2015 | Lee et al. |
| 2003/0083024 A1 | 5/2003 | Richenstein et al. |
| 2005/0245292 A1 | 11/2005 | Bennett et al. |
| 2006/0223465 A1 | 10/2006 | Akiba et al. |
| 2008/0132294 A1 | 6/2008 | Bennett et al. |

AUTOMATIC POWER-OFF OF WIRELESS COMMUNICATION DEVICE FROM LINKED DEVICE

CROSS-REFERENCE TO RELATED APPLICATIONS

This application is a continuation of U.S. patent application Ser. No. 14/623,369, titled "Automatic Power-Off of Wireless Communication Device from Linked Device", filed on Feb. 16, 2015, now issued as U.S. Pat. No. 9,344,966, which is a continuation of U.S. patent application Ser. No. 13/854,242, titled "Automatic Power-Off of Bluetooth Device from Linked Device", filed on Apr. 1, 2013, now issued as U.S. Pat. No. 8,959,368, which is a continuation of U.S. patent application Ser. No. 13/167,477, filed on Jun. 23, 2011, of the same title, now issued as U.S. Pat. No. 8,412,964, which is a divisional of U.S. patent application Ser. No. 11/650,067, filed on Jan. 5, 2007, of the same title, now issued as U.S. Pat. No. 7,987,378. The above-referenced applications are hereby incorporated by reference in their entirety as though fully and completely set forth herein.

BACKGROUND OF THE INVENTION

The present invention relates to circuitry for powering-off electronic devices. More particularly, the present invention relates to circuitry that allows one electronic device to initiate a power-off process in another electronic device.

Cost, comfort, and simplicity of operation are important factors in many consumer electronics. Bluetooth® devices, especially Bluetooth phone headsets, are an example of useful devices that are often burdened by a relatively large size and overly complicated operation. Bluetooth devices typically include buttons and other controls that, while providing functionality, make use complicated and drive up the cost and weight of the device. For example, Bluetooth headsets might have individual controls for answering and terminating calls, controlling volume, and powering on/off. In the case of Bluetooth headsets, which typically mount onto a user's ear, the added weight and size from these controls might lead to a less comfortable fit.

Another common problem with these devices is related to battery life. Even after a user has completed a call, the user often forgets to turn off the device. For this reason, many devices typically include things such as timing circuits that power the device off if it hasn't been used for a given amount of time. The problem with that "solution," however, is that it still wastes battery power even though the device is not in use.

Another problem with these types of devices is related to air travel. In many instances, airport security requires electronic devices to be powered on individually. Similarly, flight attendants often demand that all electronic devices be shut off prior to take off or landing. These situations often require a user to turn off multiple different devices and can lead to devices being dropped and potential damage.

SUMMARY OF THE INVENTION

Methods and systems for powering-off a Bluetooth device from a linked device are provided. A device can transmit a Bluetooth signal to a linked device to instruct the linked device to power-off. In this manner, the user need only turn off one device manually which results in all linked devices being powered off. This process can be initiated by a user through a device directly linked with the device to be powered-off or through a device that is indirectly connected, through one or more Bluetooth networks, with the device to be powered-off. This process can also be automatically initiated by a device when a set of predetermined conditions exist. Once instructed to do so, a device can initiate a predetermined power-off process which can involve terminating any ongoing functions and turning off various subsystems. In accordance with the present invention, a user can initiate a power-off of all the devices on a Bluetooth network through a single device.

In another embodiment, a Bluetooth device can transmit a signal to a linked device which instructs the linked device to switch to a power-saving mode. This predetermined power-saving mode can define the device's Bluetooth communications and other functions. For example, when instructed by another device, a linked device can restrict its Bluetooth communications to minimal activity and configure other subsystems for power conservation.

BRIEF DESCRIPTION OF THE DRAWINGS

The above and other features of the present invention, its nature and various advantages will be more apparent upon consideration of the following detailed description, taken in conjunction with the accompanying drawings.

DETAILED DESCRIPTION OF THE INVENTION

Figure 1:
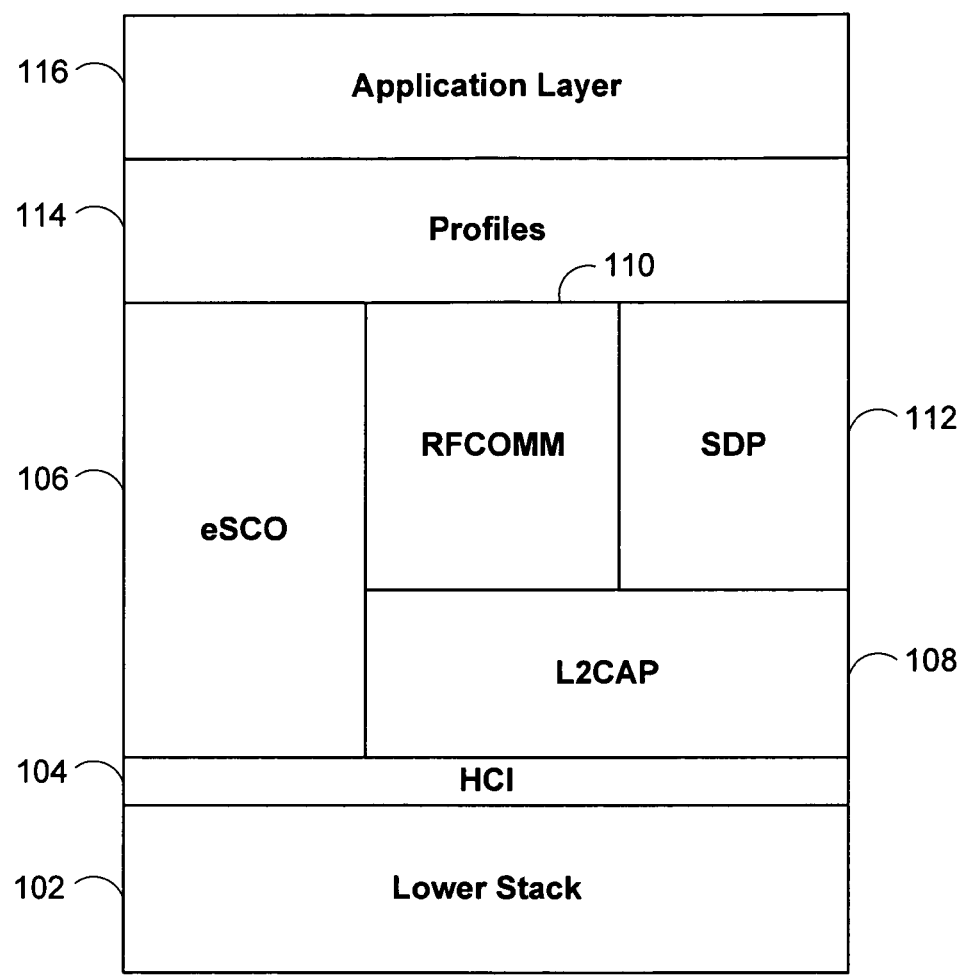
FIG. 1 is a simplified schematic diagram showing how software in a Bluetooth device is organized.

Bluetooth wireless technology has the potential to revolutionize personal connectivity by providing users with freedom from wired connections. Bluetooth is a standard, or protocol, designed to provide a low cost radio solution that creates wireless links between mobile computers, mobile phones and other portable and handheld devices.

Bluetooth wireless technology is based on an international, open standard for allowing intelligent devices to communicate with each other through wireless, low power, short-range communications. This technology allows any sort of electronic equipment, from computers and cell phones to keyboards and headphones, to make its own connections, without wires or any direct action from a user. Bluetooth is already incorporated into numerous commercial products including laptop computers, PDAs, cell phones and printers, with more products coming out every day.

Bluetooth is referred to as a frequency hopping spread spectrum (FHSS) radio system that operates in the 2.4 GHz unlicensed band. What this means is that Bluetooth transmissions change frequencies based on a sequence which is known to both the transmitter and the receiver. According to the current standard, Bluetooth transmissions use 79 different frequencies ranging from 2.404 GHz to 2.480 GHz. Bluetooth's low power transmissions allow a typical range of about 10 meters or roughly 30-40 feet. This range can vary from about 1 meter to 100 meters depending on the amount of power used by the device for Bluetooth.

Bluetooth devices connect to each other to form networks known as piconets. A piconet includes two or more devices which are synchronized to a common clock signal and hopping sequence. What this means is that the two devices are operating using two characteristics that can vary from device to device but are matched in this instance to help form the network. Any other devices that connect to a given piconet must also have the same clock signal and hopping sequence. The synchronized clock and hopping sequence are derived using the clock signal of one of the devices on the piconet. This device is often referred to as the "master" device while all other devices on the piconet are referred to as "slave" devices. Each piconet includes one master device and up to seven slave devices. Moreover, Bluetooth devices can belong to more than one piconet. The term "scatternet" is used to define Bluetooth networks which are made up of multiple, overlapping piconets. In the case where one Bluetooth device is on two or more piconets, all of the devices are on a single scatternet. Devices from one of the piconets can communicate with devices from another piconet by using the shared device to relay the signals.

When two Bluetooth devices initially connect, they first share some general information (e.g. device name, device type, etc.) with each other. In order to enhance the connection, the devices can establish a trusted relationship by using a secret passkey. This passkey is typically provided by a user or stored on memory in a device. According to the Bluetooth standard, the process of establishing this trusted relationship is called pairing. Once two devices are paired, they will typically share more information and accept instructions from one another.

Using technology available today, Bluetooth devices can operate with a maximum data throughput of approximately 2.1 Mbit/s (Megabits-per-second), but the principles of the present invention can also be applied to devices operating at other rates, particularly if the Bluetooth standard evolves. This maximum throughput is shared between all devices on a piconet meaning that if more than one slave device is communicating with the master, the sum of all communications must be less than the maximum data throughput.

The Bluetooth standard includes a published software framework. The shared framework is called the Bluetooth Protocol Stack and includes the different parts of software required to implement Bluetooth communications. FIG. 1 is a simplified schematic diagram of an exemplary Bluetooth Protocol Stack 100. The most low-level software is included in Lower Stack 102. This section includes code to generate/receive radio signals, correct transmission errors and encrypt/decrypt transmissions, among other things. The Host Controller Interface (HCI) 104 is a standardized interface between the low-level Bluetooth functions and applications. Often, the HCI layer will represent a division between the Lower Stack 102 functions handled by a dedicated Bluetooth processor and the rest of the functions handled by an application-specific processor.

The Extended Synchronous Connection-Oriented (eSCO) 106 layer is used to implement dedicated communication channels, commonly used for voice data, in between the Lower Stack 102 and high-level applications. The Logical Link Control and Adaptation Protocol (L2CAP) 108 layer combines and repackages the data transmitted and received by the multiple higher-level applications. The L2CAP 108 layer combines all of these different communications into one data stream that can interface with Lower Stack 102 The RFCOMM 110 layer emulates the protocol used by serial connections. This allows software designers to easily integrate Bluetooth into existing applications which previously used a serial connection. The Service Discovery Protocol (SDP) 112 layer is used by devices to provide information about what services (or functions) each device offers and how other devices can access those services through Bluetooth.

The Profiles 114 layer allows a device to identify itself as a member of a generic group of devices with a predefined set of functions. For example, a device complying with the headset profile will support predefined methods relating to audio communications. The Application Layer 116 contains programs that implement the useful tools created by all of the other layers. By writing different programs for Application Layer 116, software developers can focus on new uses of the Bluetooth functionality without having to rewrite the code which controls the underlying communication tasks.

Figure 2:
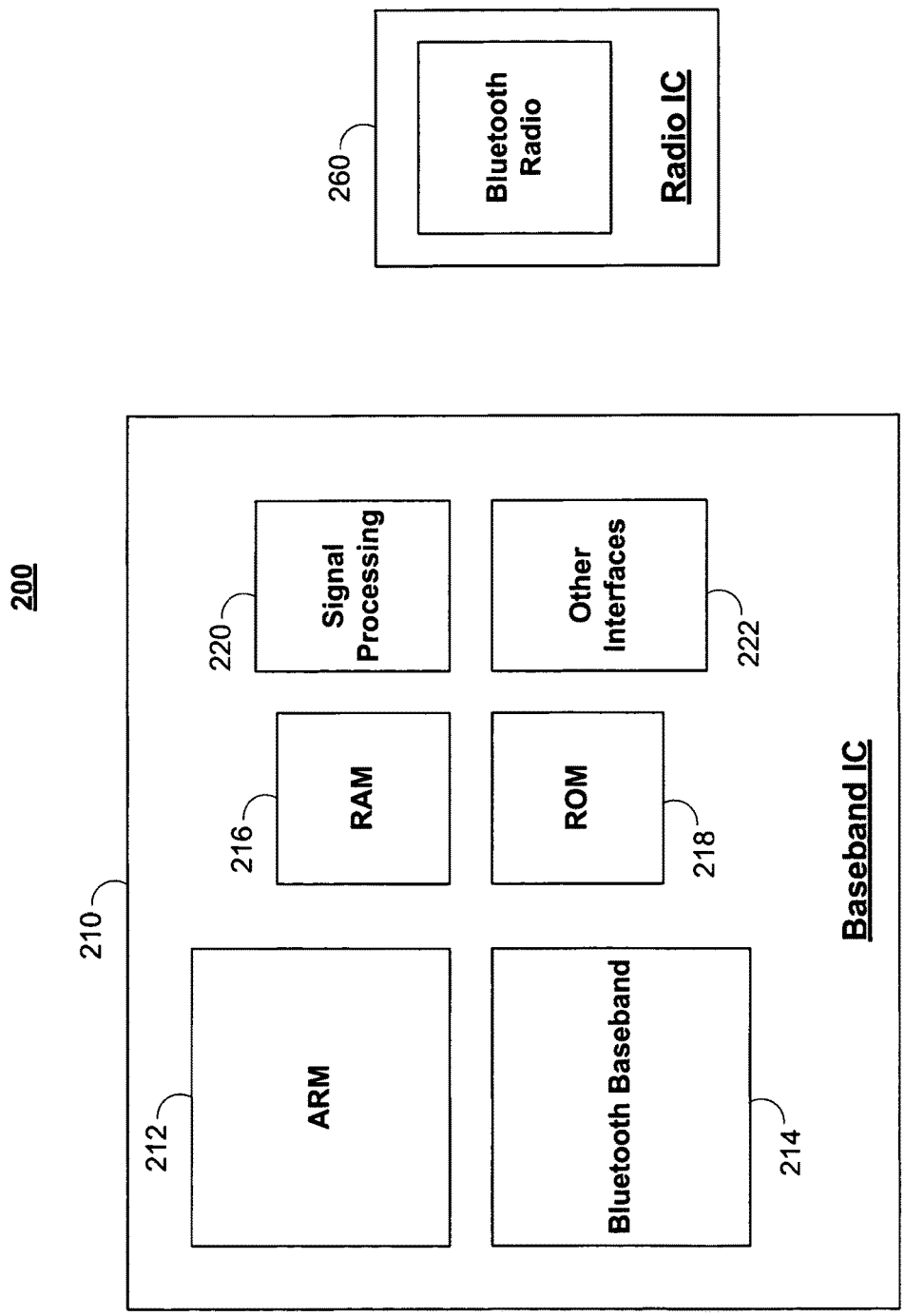
FIG. 2 is a simplified schematic diagram of an exemplary hardware implementation of a Bluetooth device.

Bluetooth hardware is typically implemented using highly integrated systems that can consist of one or more complex integrated circuits (IC). FIG. 2 is a block diagram that illustrates one exemplary implementation of Bluetooth hardware. In this implementation, the system has been divided into two ICs, baseband integrated circuit 210 and radio integrated circuit 260.

The baseband IC can include central processor 212 (referred to as ARM 212, for the type of processor often used in portable devices), Bluetooth baseband processor 214, random access memory (RAM) 216, read-only memory (ROM) 218, signal processing circuitry 220 and interface circuitry 222. Central processor 212 can be, for example, an ARM processor that performs higher-level application functions. Bluetooth baseband processor 214 can perform Bluetooth specific functions, such as eSCO 106, L2CAP 108, RFCOMM 110 and SDP 112. RAM 216 and ROM 218 can be used to store data. Signal processing circuitry 220 can be used to filter or decompress data. Interface circuitry 222 can allow the device to communicate over other interfaces besides Bluetooth, such as the Universal Serial Bus (USB) interface.

Transmitting and receiving radio signals can be implemented in a separate Radio IC 260. This separate circuit approach is often desirable because of the precision necessary for generating high-frequency radio signals. By incorporating all of the other less precise, non-radio circuits into the Baseband IC, this implementation offers a small, low power, low cost solution.

Persons of ordinary skill in the art will appreciate that any references to Bluetooth protocols in this application encompass both existing protocols as well as Bluetooth protocols that may be developed in the future.

Figure 3:
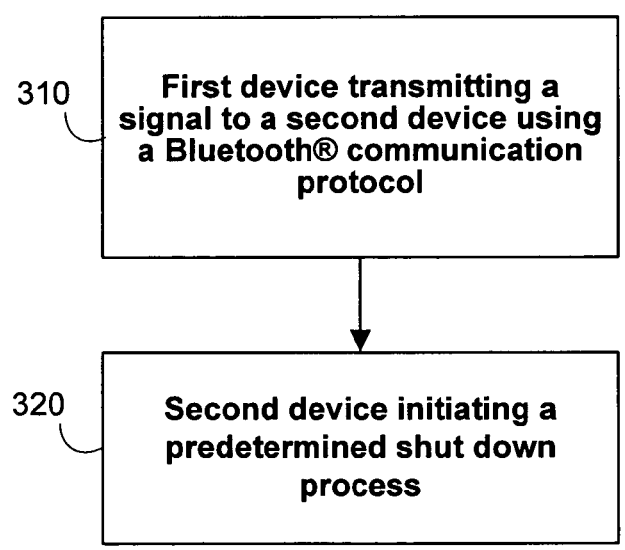
FIG. 3 is a flowchart of a method for powering off a device in accordance with the principles of the present invention.

FIG. 3 is a flowchart of process 300 for powering off a Bluetooth device from a linked device. The devices in process 300 can be any devices capable of communicating over a Bluetooth communication protocol. At step 310, a first device transmits a signal to a second device using a Bluetooth communication protocol. The signal can include an instruction for the second device to power-off. The signal can include additional information related to the two devices. For example, the signal can include the battery level of the second device or a time that the second device should turn back on.

Step 310 can be initiated by a user input. The user can initiate powering-off the second device through a graphical interface or a voice recognition system. Step 310 can be automatically initiated as part of other processes in the first device. For example, the first device might send a power-off signal to the second device if a power-off process is initiated in the first device. In this case, the first device would proceed to power itself off down after the power-off signals have been sent to one or more other devices.

In accordance with the present invention, a user may configure the first device so that every time the first device turns off it also sends power-off signals to selected, or possibly all, Bluetooth devices in its network. In another embodiment, the first device may transmit power-off signals to other devices if it is switched to an "airplane mode" which restricts wireless communications. In another embodiment, the first device might instruct the second device to power-off if the first device recognizes a low-battery condition that would force itself to turn off. In this example, the second device's power would not be wasted trying to communicate with the first device after it has powered-off.

The signal in step 310 can be transmitted directly from the first device to the second device. In another embodiment, the signal in step 310 can be transmitted through intermediate devices, such as an ad hoc Bluetooth network. What this means is that a first device can transmit a power-off signal to a third device which can relay that signal to the second device.

At step 320, the second device can power-off so that it is no longer using power. Step 320 can involve a predetermined power-off procedure. This power-off procedure can involve, for example, terminating any ongoing processes, moving any data to permanent storage, and disconnecting power. The power-off procedure can include an auditory or visual alert that a device has turned off. For example, an LED can blink or a speaker can beep to notify a user that the second device has powered off. This power-off process can also involve turning off any other devices which are connected to the second device. Herein the term turning-off relates to a powering-off process.

In accordance with the present invention, the second device can function without a dedicated power button. Because the device is turned off through the first device, the same button that turns on the device can be used to answer and terminate calls once the headset is on. This reduction in buttons, can simplify the design and improve the aesthetic appeal of the second device.

Figure 4:
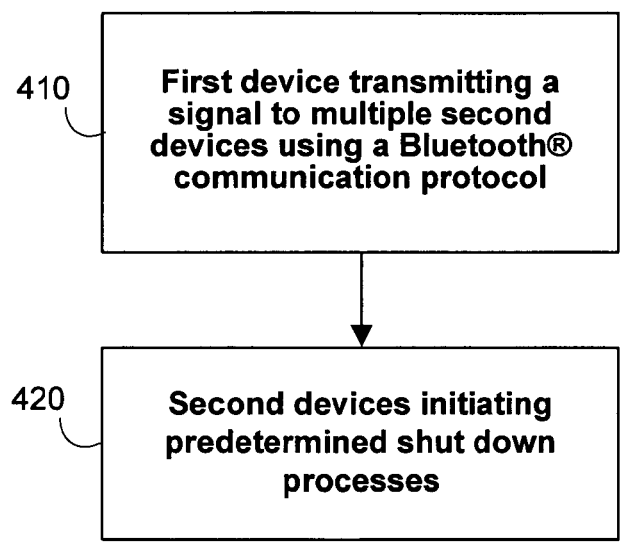
FIG. 4 is a flowchart of a method for powering off a Bluetooth network in accordance with the principles of the present invention.

FIG. 4 is a flowchart of process 400 for powering off a Bluetooth network from a linked device. A first device in process 400 can be a master or a slave in a Bluetooth network. At step 410, the first device can transmit a power-off signal to multiple devices using a Bluetooth communication protocol. The first device can directly transmit signals to other devices, or the first device can transmit signals to other devices through an intermediate device. What this means is that the first device might not be directly communicating with other devices that it is instructing. In this case, an intermediate device can relay the signals from the first device. For example, if the first device is a slave device then it can transmit a power-off signal to a master device first which can then relay the signal to all of the other slave devices in the Bluetooth network. At step 420, all of the devices that receive the signal initiate a predetermined power-off sequence.

Figure 5:
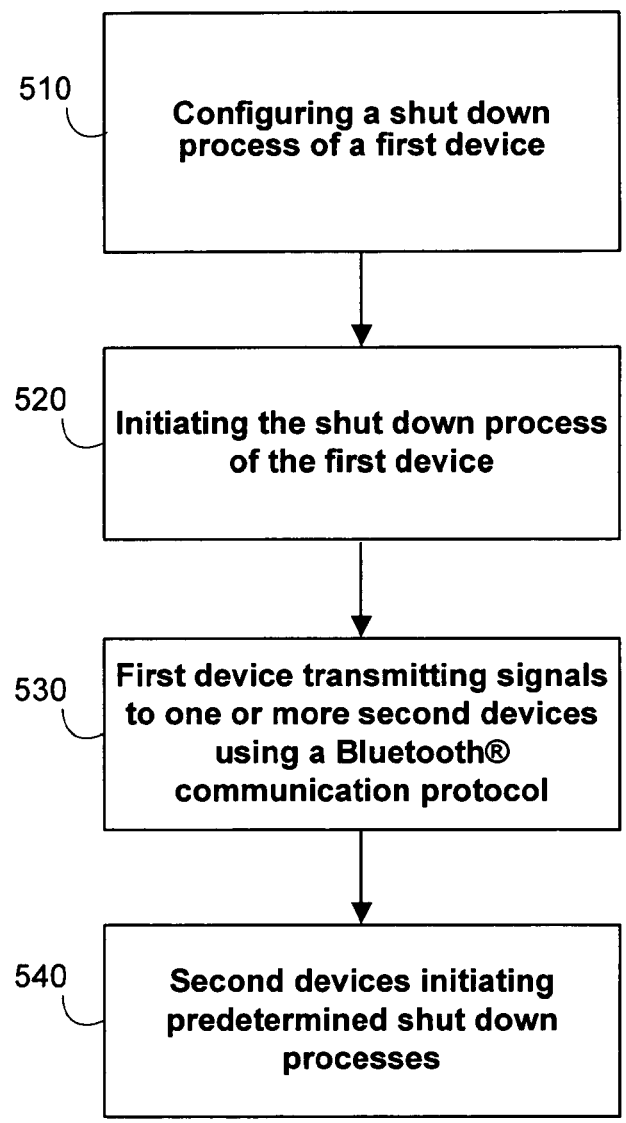
FIG. 5 is a flowchart of a method for switching a device to a power-saving mode in accordance with the principles of the present invention.

FIG. 5 is a flowchart of process 500 for configuring and using a device to power-off other devices in accordance with the present invention. At step 510, the process for powering-off a first device can be configured. The power-off process can be configured so that some or all devices connected to the first device are turned off when the first device is in the process of powering-off. A user can configure the power-off process of the first device through a user interface which includes a way to select which other devices should be turned off if the first device is turned off. This user interface can also be used to configure other aspects of the power-off process, such as a time for the first device to automatically turn back on. It is contemplated that this configuration could also be done through a voice recognition system on the first device. At step 520, the power-off process of the first device can be initiated. A user can interface with a power button to initiate this power-off process. In accordance with the present invention, the power-off process can be automatically initiated if the first devices battery level goes below a threshold. At step 530, the first device transmits signals to one or more second devices using a Bluetooth communications protocol. These signals can instruct the second devices to turn off. At step 540, the second devices initiate predetermined power-off processes. In accordance with the present invention, the first device can continue to power itself off after it has transmitted power-off signals to the second devices.

Figure 6:
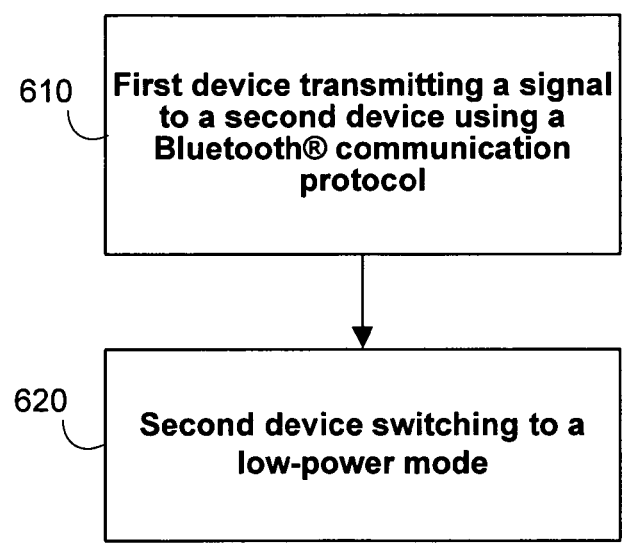
FIG. 6 is an illustration of an embodiment of a system in accordance with the principles of the present invention.

FIG. 6 is a flowchart of process 600 for switching a second device to a low-power mode. At step 610, a first device transmits a signal to a second device that instructs the second device to go to a low-power mode. The signal can be transmitted using a Bluetooth communication protocol. At step 620, the second device can switch to a low-power mode. The process of switching to the low-power mode can involve the second device changing to Sniff, Hold, or Park Mode. These modes are defined in Bluetooth specifications and can be summarized as follows: in Sniff Mode a device checks for Bluetooth signals at a reduced rate, in Hold Mode a device remains synchronized with the network and retains its active status without actually participating, and in Park Mode a device gives up its active status while maintaining synchronization. Out of these power saving modes, park mode uses the least amount of power, and sniff mode uses the most. In accordance with the present invention, the first device can monitor the battery level of the second device. If the battery level drops below a predetermined threshold, the first device can instruct the second device to switch to a low-power mode when not in use. For example if a phone headset's battery power is below a certain level, a phone can instruct the headset to switch to a low-power mode, such as Hold. In this example, the phone can instruct the headset to change back to full power operation if it receives a call.

It is contemplated that other low-power modes, which perhaps aren't defined in the current or future Bluetooth specifications, can be used in accordance with the principles of the present invention. For example, a device can go into an airplane mode in which it doesn't communicate at all, but remains powered on. Thus, it is not required that the operation of the device being controlled be conforming to a Bluetooth specification. In another example, a device can go into a limited activity mode in which certain functions, possibly unrelated to communications, are disabled.

Figure 7:
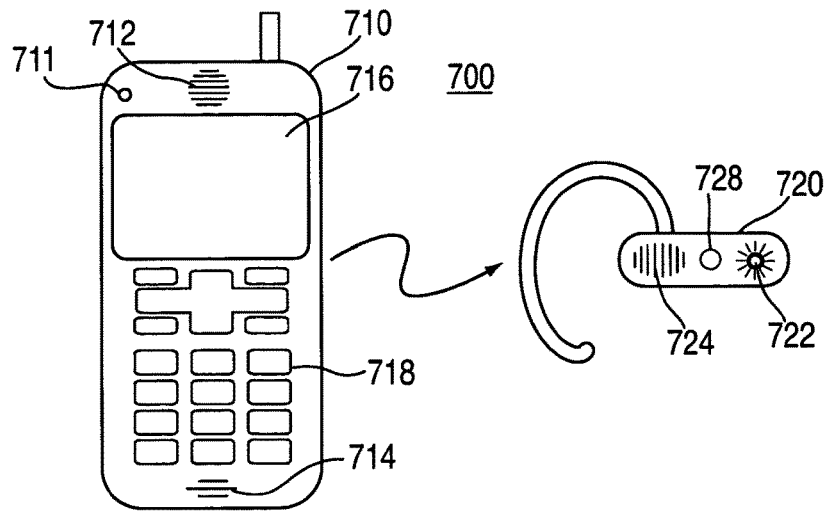
FIG. 7 is an illustration of a sample screenshot of a user interface of a device which can be operated in accordance with the principles of the present invention.

FIG. 7 shows Bluetooth system 700 which includes devices 710 and 720. Devices 710 and 720 can be any devices capable of communicating using a Bluetooth protocol but in this instance are cellular phone 710 and headset 720. Cell phone 710 can include power button 711, speaker 712, microphone 714, display screen 716 and keypad 718. Headset 720 can include light 722, speaker 724 and button 728. Phone 710 and headset 720 can include batteries so that they are portable devices. A user can input commands into phone 710 with keypad 718 and power button 711. In accordance with the present invention, a user can configure device 710 so that power button 711 can be used to power off other devices in device 710's Bluetooth network. It is also contemplated that voice recognition circuitry can be used to process input commands in accordance with the present invention.

Phone 710 and headset 720 can use dedicated circuitry or a central processor for generating and receiving a power-off signal. Phone 710 and headset 720 can include Bluetooth hardware operable to transmit and receive power-off signals. This Bluetooth hardware can have other functions besides handling power-off signals, such as relaying audio data for telephone conversations. Phone 710 and headset 720 can use a central processor to monitor and control power-off procedures.

In one embodiment, a user can interface with keyboard 718 to cause phone 710 to transmit a power-off signal to headset 720. After receiving the power-off signal, headset 720 can initiate a procedure to power itself off. In another embodiment, a user can interface with power button 711 to initiate a power-off process in phone 710. As part of the power-off process, phone 710 can transmit a power-off signal to headset 720 which can subsequently power itself off. In this embodiment, headset 720 won't waste any power trying to communicate with phone 710 after the phone has been powered-off. Phone 710 can transmit power-off signals to any other devices that it is communicating with. In yet another embodiment, a user can interface with keypad 718 to switch phone 710 into airplane mode. As part of the process of switching to airplane mode, phone 710 can transmit a power-off signal to headset 720.

Button 728 can control multiple aspects of the operation of headset 720. For example, button 728 can be used to turn headset 720 on. Once headset 720 is on, button 728 can be used to accept and terminate calls. Button 728 can be designed as a rocker switch or a joystick. If button 728 is a rocker switch, it can control, for example, the volume levels of headset 720. Button 728 can be double-clicked in order to input a different instruction, for example speed dial. Because headset 720 can be powered off with phone 710, no button needs to be reserved for powering-off headset 720.

Figure 8:
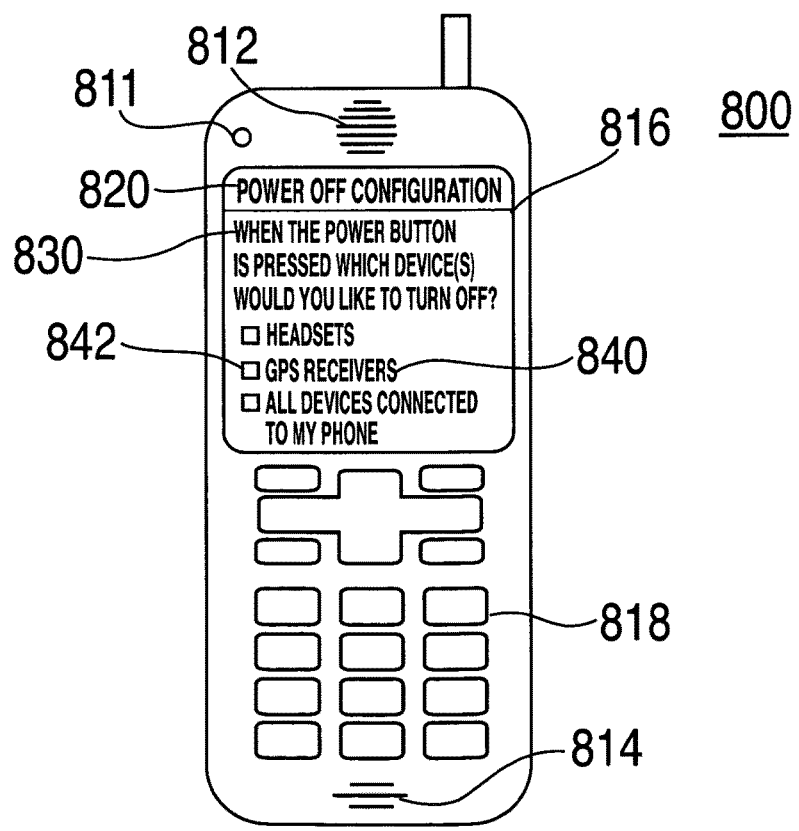
FIG. 8 is an illustration of a sample screenshot of a user interface of a device which can be operated in accordance with the principles of the present invention.

FIG. 8 includes a sample screenshot of the user interface used to configure the power-off process of master device 800. Device 800 can include power button 811, speaker 812, microphone 814, screen 816 and keypad 818. Screen 816 can include title 820 to identify the information displayed. Screen 816 can include description 830 that explains to a user the significance of his inputs. Screen 816 can also include list 840 of types of devices that can be connected to device 800. List 840 can include checkboxes 842 next to each type of device that can indicate whether that device is selected. List 840 can also include option 844 to select all devices that are connected to phone 800. If option 844 is selected, phone 800 can transmit a power-off signal to all devices on the phone's Bluetooth network when power button 811 is pushed.

Although the methods and systems described above involve communications using a Bluetooth protocol, it may be possible to utilize any communication protocol without deviating from the spirit of the present invention. For example, it may be possible to utilize a device that can transmit power-off signals to other devices using Wireless USB, an IEEE 802.11 protocol, or any other communication protocol. In this manner, it may also be possible to utilize a combination of different protocols in accordance with the principles of the present invention. Referring to step 530 of process 500 in FIG. 5, the first device can transmit to one or more second devices using as many different communication protocols as necessary. Moreover, an intermediate step could take place between step 530 and step 540 in which one or more second devices relay the power-off signal to other devices which the first device might not be able to communicate with.

Thus it is seen that descriptions of methods and systems for powering-off a Bluetooth device from a linked device are provided. A person skilled in the art will appreciate that the present invention may be practiced by other than the described embodiments, which are presented for purposes of illustration rather than of limitation.

The invention claimed is:

1. An electronic device comprising:
a radio frequency transceiver; and
processor electronics configured to perform operations comprising:
   detecting a condition causing the electronic device to transition from a present power state to a lower-power state, wherein detecting the condition comprises at least one of: detecting a battery threshold corresponding to a battery included in the electronic device, and detecting a battery threshold corresponding to a battery included in the second device;
   determining at least a second device to transition to a lower-power mode in response to the electronic device transitioning to a lower-power state;
   transmitting a message, via the radio frequency transceiver, instructing the second device to transition to the lower-power mode; and
   transitioning to the lower-power state.

2. The electronic device of claim 1, wherein the lower-power mode comprises one of a sniff mode, a hold mode, or a park mode.

3. The electronic device of claim 1, wherein the lower-power state comprises a power-off state.

4. The electronic device of claim 1, wherein transmitting the message further comprises:
transmitting the message in accordance with a Bluetooth communication protocol.

5. The electronic device of claim 4, wherein transmitting the message further comprises:
transmitting the message over a direct communication link with the second device.

6. The electronic device of claim 1, further comprising:
transmitting an other message, via the radio frequency transceiver, instructing a third device to transition to a lower-power mode.

7. The electronic device of claim 6, wherein transmitting the other message further comprises:
transmitting the other message over an indirect communication link with the third device.

8. An electronic device comprising:
a radio frequency transceiver; and
processor electronics configured to perform operations comprising:
   detecting a condition causing the electronic device to transition from a present power state to a lower-power state;

determining at least a second device to transition to a lower-power mode in response to the electronic device transitioning to a lower-power state;

transmitting a message, via the radio frequency transceiver, instructing the second device to transition to the lower-power mode, wherein the message further comprises an indication of a time at which the second device should transition to a higher-power mode; and transitioning to the lower-power state.

9. The electronic device of claim 1, wherein the condition comprises an instruction to transition to an airplane mode.

10. A method for changing a device power state, the method comprising:

detecting, at a wireless communication device, a condition causing the wireless communication device to transition to a lower-power state;

generating a message configured to cause a second wireless communication device to transition to a lower-power mode, wherein generating the message further comprises indicating a time at which the second wireless communication device should transition to a higher-power state;

transmitting the message to the second wireless communication device over a direct wireless communication link; and transitioning, by the wireless communication device, to the lower-power state.

11. The method of claim 10, wherein the condition comprises receiving a manual input received at an interface of the wireless communication device.

12. The method of claim 10, wherein the condition comprises receiving a voice command at an interface of the wireless communication device.

13. The method of claim 10, wherein transitioning to the lower-power state is performed automatically.

14. The method of claim 10, further comprising:

determining that the second wireless communication device has been selected during configuration of a power-off process associated with the wireless communication device.

15. The method of claim 10, wherein detecting the condition further comprises:

detecting a battery threshold corresponding to a battery included in the wireless communication device.

16. The method of claim 10, wherein detecting the condition further comprises:

detecting a battery threshold corresponding to a battery included in the second wireless communication device.

17. The method of claim 10, further comprising:

transmitting an other message, via the radio frequency transceiver, instructing a third wireless communication device to transition to a lower-power mode.

18. The method of claim 17, wherein transmitting the other message further comprises:

transmitting the other message over an indirect communication link with the third wireless communication device.

* * * * *